United States Patent
Chien et al.

(10) Patent No.: US 8,306,109 B2
(45) Date of Patent: Nov. 6, 2012

(54) METHOD FOR SCALING VIDEO CONTENT BASED ON BANDWIDTH RATE

(75) Inventors: Shao-Yi Chien, Taipei (TW); Jui-Hsin Lai, Taipei (TW)

(73) Assignee: National Taiwan University, Taipei (TW)

( * ) Notice: Subject to any disclaimer, the term of this patent is extended or adjusted under 35 U.S.C. 154(b) by 540 days.

(21) Appl. No.: 12/556,214

(22) Filed: Sep. 9, 2009

(65) Prior Publication Data

US 2010/0309973 A1 Dec. 9, 2010

(30) Foreign Application Priority Data

Jun. 5, 2009 (TW) .............................. 98118748 A

(51) Int. Cl.
*H04N 11/02* (2006.01)

(52) U.S. Cl. ............. 375/240.02; 348/14.12; 348/14.13; 386/353; 370/468; 709/231

(58) Field of Classification Search ........................ None
See application file for complete search history.

(56) References Cited

U.S. PATENT DOCUMENTS

| | | | |
|---|---|---|---|
| 6,526,183 B1 * | 2/2003 | Bonnet et al. ................. | 382/284 |
| 6,882,755 B2 | 4/2005 | Silverstein et al. | |
| 7,010,043 B2 | 3/2006 | Kerofsky et al. | |
| 7,477,794 B2 | 1/2009 | Lefebvre et al. | |
| 2005/0271269 A1 * | 12/2005 | Errico et al. .................. | 382/164 |
| 2009/0097551 A1 * | 4/2009 | Zhang et al. ............. | 375/240.03 |

* cited by examiner

*Primary Examiner* — Ayaz Sheikh
*Assistant Examiner* — Nicholas Sloms
(74) *Attorney, Agent, or Firm* — Muncy, Geissler, Olds & Lowe, PLLC

(57) ABSTRACT

A method for scaling video content based on bandwidth rate is disclosed. Wherein, a plurality of target shots and non-target shots are recognized from shots of a video. A background and at least one foreground object are separated from the video frame of the target shot. The present invention method provides a plurality of bandwidth levels, and one among them is selected in advance. At least one foreground object is selected and pasted on the background based on the selected bandwidth level, so as to obtain at least one recombined target shot. The recombined target shot, the non-target shot or other recombined target shot can be merged to form a recombined video unit based on the selected bandwidth level. Therefore, the present invention proposes video content of scalability based on bandwidth rate to provide the different video bit-stream size, so that viewer can get the high quality video under the lower bandwidth rate.

26 Claims, 19 Drawing Sheets

Level 1

METHOD FOR SCALING VIDEO CONTENT BASED ON BANDWIDTH RATE

CROSS-REFERENCE TO RELATED APPLICATION

This application is related to commonly assigned U.S. patent application Ser. No. 12/458,042, filed Jun. 30, 2009, entitled "Method for decomposition and rendering of video content and user interface for operating the method thereof", which patent application is incorporated herein by reference.

FIELD OF THE INVENTION

The present invention is related to a method for scaling video content based on bandwidth rate, used for providing different video bit-stream size, so that viewer can obtain the high quality video under the lower bandwidth rate.

BACKGROUND OF THE INVENTION

Watching sport games is the popular entertainment in the life, and viewers watch the games via television, computer or mobile phone. However, viewer cannot often enjoy the high quality videos everywhere due to the limitation of transmission bandwidth.

Scalable video coding (SVC) is a current standardization project of video compression, which is able to scale the size of video bit-stream based on the differential bandwidth rate. Besides, SVC can achieved the request of lower bandwidth rate by reducing the resolution of video, decreasing the number of video frames, or reducing the quality of video; however, the watching quality under those lower bandwidth rate is often seriously decreased to an unacceptable point.

Therefore, how to provide the high quality video under the lower bandwidth rate, and thus more enjoyment on game watching is the object to be achieved by the present invention.

SUMMARY OF THE INVENTION

It is one object of the present invention to provide a method for scaling video content based on bandwidth rate, the present invention proposes video content of scalability based on bandwidth rate to provide different video bit-stream size, so that viewer can have high quality video under the lower bandwidth rate.

It is another object of the present invention to provide a method for scaling video content based on bandwidth rate, a plurality of target shots are recognized from the video, a background and at least one foreground object are separated from the video frame of the target shot, and then a compiling process is performed on the background to generate the plentiful visual effect, which is done so that viewers may get more enjoyment in their viewing.

It is further object of the present invention to provide a method for scaling video content based on bandwidth rate, the video content can be analyzing and annotating in advance, so as to allow a viewer to click and select a desired video unit immediately via the annotated video units.

To achieve above objects, the present invention provides a method for scaling video content based on bandwidth rate, wherein the video comprising a plurality of shots, a plurality of target shots and a plurality of non-target shots recognized from the shots of the video, each of the target shots comprising a sequence of video frames, the video frame comprising a background scene and at least one foreground object, separating each of the foreground objects from the video frame, transforming the video frame into a sprite plane, transforming the sprite plane into a watching frame, the above mentioned method of scaling video content based on the bandwidth rate, comprising the steps of: providing a plurality of bandwidth levels, and one among the bandwidth levels is selected; At least one foreground object is selected and pasted on the watching frame based on the selected bandwidth level, so as to obtain at least one recombed target shot; and merging the recombined target shot with the non-target shot or merging the recombined target shot with other recombined target shot based on the selected bandwidth level to form a recombined video unit.

The present invention further provides a method for scaling video content based on bandwidth rate, wherein the video comprising a plurality of shots, a plurality of target shots and a plurality of non-target shots recognized from the shots of the video, each of the target shots comprising a sequence of video frames, the video frame comprising a background scene and at least one foreground object, separating each of the foreground object from the video frame, transforming the video frame into a sprite plane, transforming the sprite plane into a watching frame, the above mentioned method of scaling video content based on the bandwidth rate, comprising the step of: providing four bandwidth levels, and according to the video-stream size, respectively comprising: a first bandwidth level, comprising pasting all of the foreground objects on the watching frame to obtain at least one recombined target shot, merging the recombined target shot with the non-target shot to form a first recombined video unit, wherein the first bandwidth level decreases the bit-stream size by reusing the sprite plane; a second bandwidth level, comprising pasting all of the foreground objects on the watching frame to obtain at least one recombined target shot, abandoning the non-target shots, merging the recombined target shot with other recombined target shot to form a second recombined video unit, wherein the second bandwidth level decreases the bit-stream size by reusing the sprite plane and abandoning the non-target shots; a third bandwidth level, comprising abandoning at least one foreground object, pasting the remaining foreground object on the watching frame to obtain at least one recombined target shot, abandoning the non-target shots, merging the recombined target shot with other recombined target shot to form a third recombined video unit, wherein the third bandwidth level decreases the bit-stream size by reusing the sprite plane, abandoning the non-target shots and abandoning at least one foreground object; a fourth bandwidth level, providing the movement coordinates information of at least one foreground object on the sprite plane so as to generate a strategy map, wherein the fourth bandwidth level decreases the bit-stream size by abandoning the video content and providing the movement coordinates information of at least one foreground object; and according to one selected among the first bandwidth level, the second bandwidth level, the third bandwidth level and the fourth bandwidth level, playing the corresponding video unit or displaying the strategy map.

The present invention further provides a method for scaling video content based on the bandwidth rate, wherein the video comprising a plurality of shots, a plurality of target shots and a plurality of non-target shots recognized from the shots of the video, each of the target shots comprising a sequence of video frames, the video frame comprising a play field scene of background and a plurality of foreground objects, the foreground objects comprising a ball, at least one player and at least one participant, separating all of the foreground objects from the video frame, transforming the video frame into a sprite plane, analyzing the information of the ball and the player of the target shot so as to obtain the trajectory and the coordinates of the ball and the player, and the position occupied by the player at the hit time, transforming the sprite plane into a watching frame, the above mentioned method of scaling video content based on the bandwidth rate, comprising the step of: providing four bandwidth levels, and according to the video-stream size, respectively comprising: a first bandwidth level, comprising pasting the player, the ball and the participant on the watching frame to obtain a recombined target shot, and merging the recombined target shot with the non-target shot to form a first recombined video unit; a second bandwidth level, comprising second pasting the player at current time and that at previous time on the watching frame so as to obtain at least one replay video clip, and merging the recombined target shot with the replay video clip to form a second recombined video unit; a third bandwidth level, comprising pasting the player and the ball on the watching frame so as to obtain the recombined target shot, and merging the recombined target shot with the replay video clip to form a third recombined video unit; a fourth bandwidth level, comprising generating a strategy map, and displaying the trajectory of the ball and the player, the coordinates of the ball and the player, or the position occupied by the player at the hit time on the strategy map; and according to one selected among the first bandwidth level, the second bandwidth level, the third bandwidth level and the fourth bandwidth level, playing the corresponding recombined video unit or display the strategy map.

DETAILED DESCRIPTION OF THE INVENTION

Figure 1:
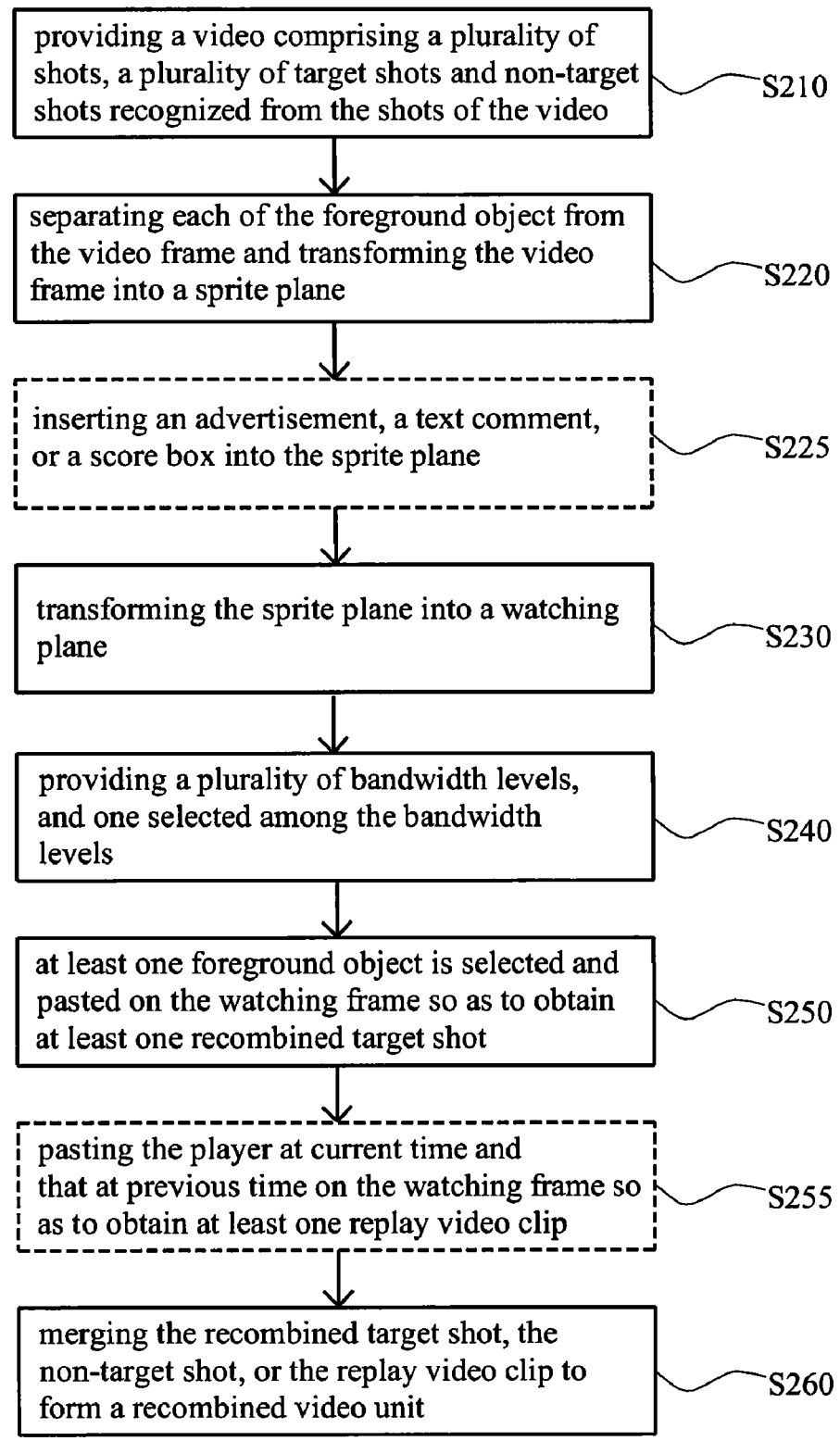
FIG. 1 is a flow chart of a method for scaling video content based on the bandwidth rate according to one embodiment of the present invention.

Referring to FIG. 1, there is shown a flow chart of a method for scaling video content based on bandwidth rate according to one embodiment of the present invention.

Figure 2:
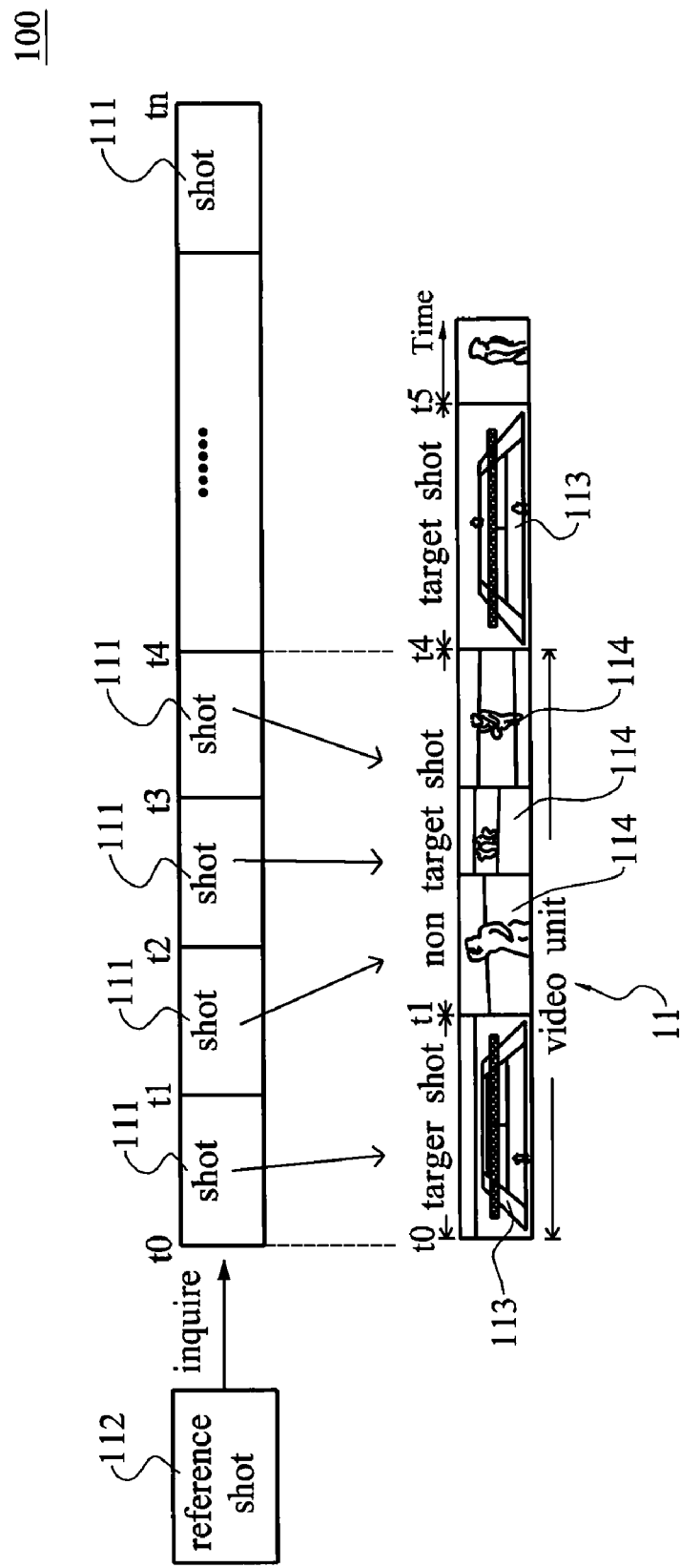
FIG. 2 is a diagram showing the structure of video according to the present invention.

First, in step S210, the present invention provides a video 100 comprising a plurality of shots 111. The method for scaling video content of the embodiment can be applied to a tennis game video. In the present invention, a reference shot 112 is used for detecting each shot 111 of video 100 so as to recognize a plurality of target shots 113 similar to the reference shot 112 and a plurality of non-target shots 114, as shown in FIG. 2. A color histogram is used for the recognition of the similarity degree between shots 111 in the present invention. If color histograms of two shots are identical, a calculation result of 1 can be obtained. Moreover, in the present invention, a threshold, such as above 0.7, is the default value for the recognition of similarity degree.

Figure 3:
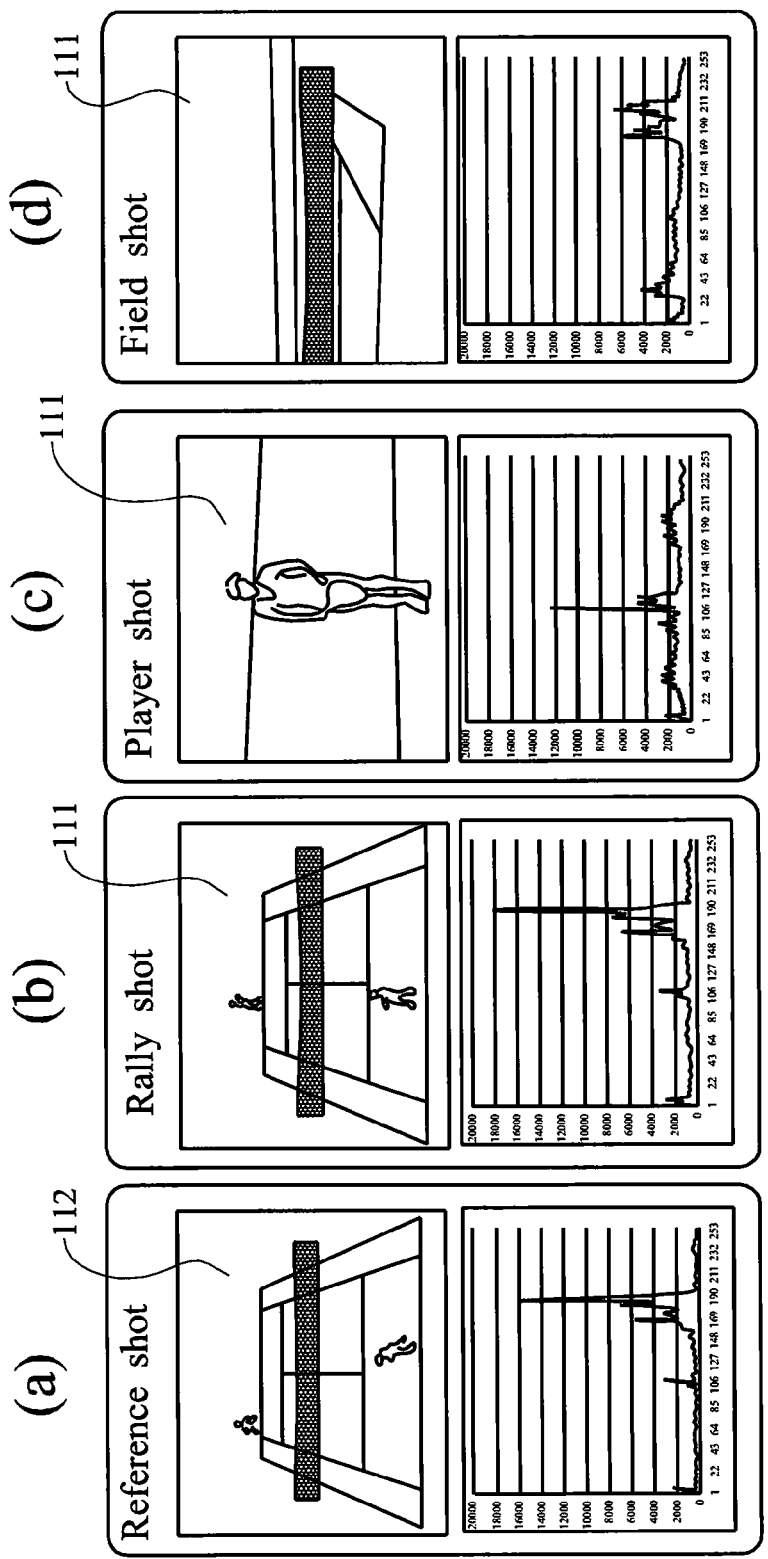
FIG. 3 shows color histograms of a reference shot and other shots according to the present invention.

Referring to FIG. 3 as an example, a serve shot is designated as the reference shot 112 of the embodiment, as shown in FIG. 3(a). The other three shots 111 to be inquired can be a rally shot, a player shot, and a field shot, respectively, as shown in FIGS. 3(b) to (d). Each shot 111/112 has the unique color distribution histogram, respectively. Subsequently, calculation of similarity degree can be performed for three shots 111 with respect to the reference shot 112, the calculation results therefrom being 0.903 (rally shot), 0.215 (player shot), and 0.307 (field shot), respectively.

On the basis of the calculation of similarity degree, the similarity degree between the rally shot 111 and the reference shot 112 is much greater than the preset threshold of the present invention, in such a way the rally shot 111 is identified as the target shot 113 to be recognized in the present invention, in other words, the rally shot 111 comprises the related information of the serve shot. On the contrary, the similarity degree between the player/field shot 111 and the reference shot 112 is much lower than the preset threshold of the present invention, in such a way the player/field shot 111 is identified as the non-target shot 114. In this way, all of the target shots 113 and the non-target shots 114 in the game video can be recognized. Furthermore, when the reference shot 112 of the embodiment is used for recognizing each shot 111, the rules for the layout of the play field can be included as the clues for recognition, such as lines, corners, and regions surrounded thereby. Rapid recognition of each target shot 113 and each non-target shot 114 are allowed with the consideration of these clues for recognition.

After each target shot 113 is recognized, the video 100 can be decomposed into a plurality of video units 11 based on the playtime of the target shot 113, and each video unit 11 comprises a target shot 113 and at least one non-target shot 114. Each video unit 11 represents a hit event, such as Ace, Double fault, Volley, Break point, Rally, etc., in the tennis video, and the video length of each video unit 11 begins at a serve shot and ends before the next serve shot, as shown in FIG. 2. In a baseball video as an example, the hit event can be Hit, Walk, Strike out, Field out, Stolen base, Double play, Double (2B), Triple (3B), and Home run, etc.

Figure 4:
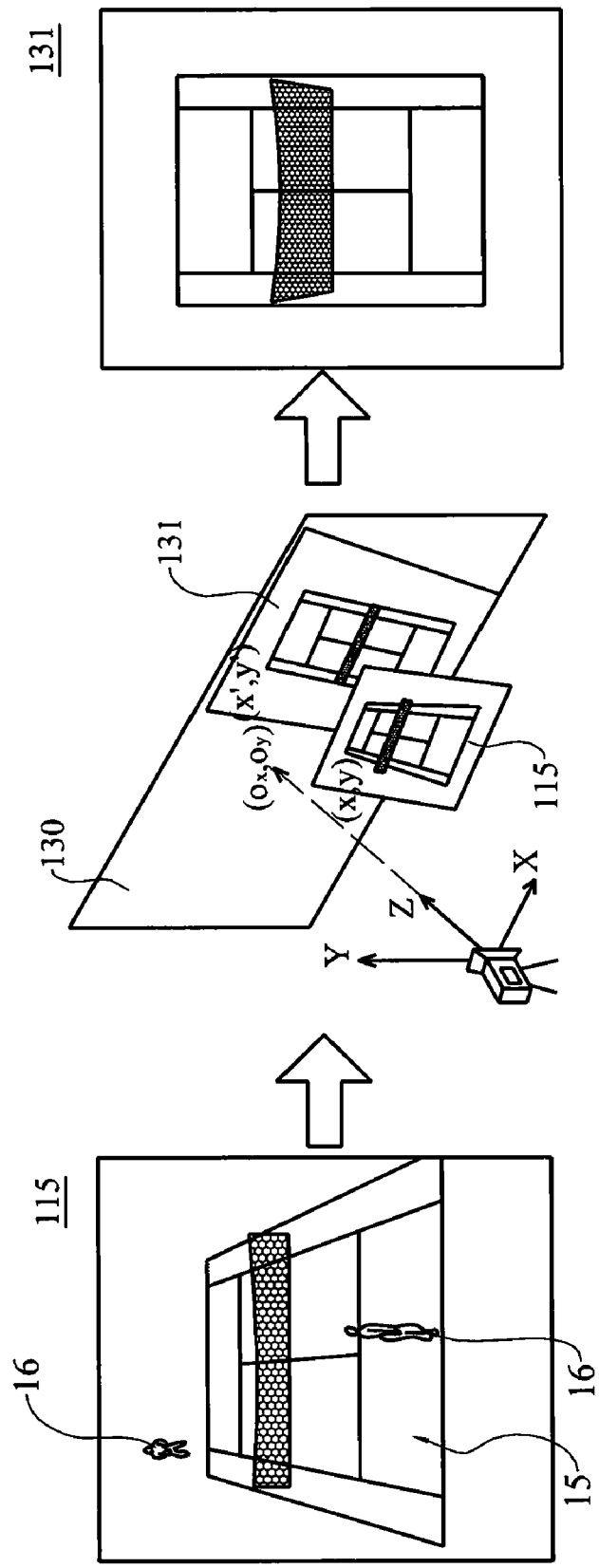
FIG. 4 is a diagram showing a process of transformation from a video frame into a sprite plane according to the present invention.

In step S220, in the present invention, a decomposition process is performed for the video content of the target shot 113 of the video unit 11 thereby separating out the background and the foreground object. The target shot 113 comprises a sequence of video frames 115, this video frame 115 comprises a background scene 15 and at least one foreground object 16, as shown in FIG. 4.

Figure 5:
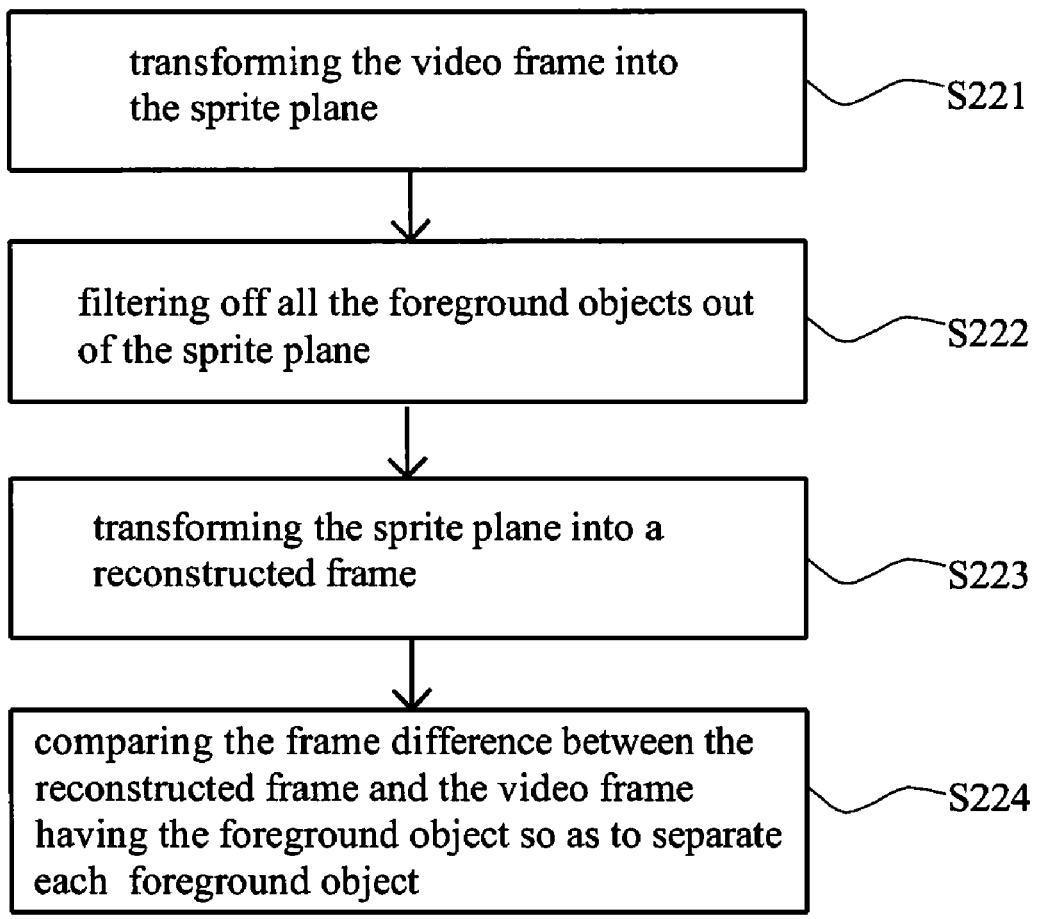
FIG. 5 is a flow chart showing the separation of each foreground object from the video frame of the target shot according to the present invention.

Further, referring to FIG. 5, there is shown the detailed flow chart of the step S220, comprising the following steps of:

In step S221, in order to separate the background scene 15 and each foreground object 16 from the target shot 113, the sprite plane 131 must be employed. The sprite plane 131 is a bird's eye view of a fiducial coordinate system, generated from the video frame 115 of the target shot 113 through a coordination transformation process of matrix $M_{V2S}$. The video frames 115 viewed at different angles can be formed in a large background view 130 in succession through the coordination transformation of matrix $M_{V2S}$, so as to generate the sprite plane 131, as shown in FIG. 4. The transformation is performed as per formula (1) shown as follows:

$$\begin{bmatrix} x' \\ y' \\ w' \end{bmatrix} = M_{V2S} \begin{bmatrix} x \\ y \\ 1 \end{bmatrix} = \begin{bmatrix} m_{v1} & m_{v2} & m_{v3} \\ m_{v4} & m_{v5} & m_{v6} \\ m_{v7} & m_{v8} & 1 \end{bmatrix} \begin{bmatrix} x \\ y \\ 1 \end{bmatrix} \quad (1)$$

Wherein, $m_{v1}$ to $m_{v8}$ are the transformation factors of the matrix $M_{V2S}$, used for the transformation of the position coordination (x, y) in the video frame 115 into the position coordination (x'/w', y'/w') in the sprite plane 131.

Moreover, in step S222, before the transformation of the video frame 115 of the target frame 113 into the sprite plane 131 of the fiducial coordination is performed, for obtaining the sprite plane 131 having the background scene 15 only, all the foreground objects 16 must be filtered off. In general situation, the foreground objects 16 (e.g., a player, ball) don't occupy the fixed region for a long time, therefore, the maximum histogram bin of the pixel value distribution of individual position coordination ($x_i$, $y_i$) in the video frame 115 during temporal domain should be the background scene 15. This can be illustrated by formulas (2) and (3) shown as follows:

$$h_{xi,yi}(k) = \#\{I_t(x_i,y_i) | I_t(x_i,y_i) = k, \forall t \in [t_1,t_2]\} \quad (2)$$

$$S(x_i, y_i) = \underset{k}{\operatorname{argmax}}\, h_{xi,yi}(k) \quad (3)$$

Wherein, $h_{xi,yi}(k)$ is a histogram bin of the pixel value k for a period of time [t1, t2] at individual position coordination ($x_i$, $y_i$) in the video frame 115. $S(x_i, y_i)$ are extracted the bin index with maximum histogram value from the histogram bins $h_{xi,yi}(k)$, and the pixel value of sprite plane 131 at the coordination ($x_i$, $y_i$). Besides, $S(x_i, y_i)$ contains information of the background scene 15 only, and all the foreground objects 16 are filtered off from the sprite plane 131.

Figure 6:
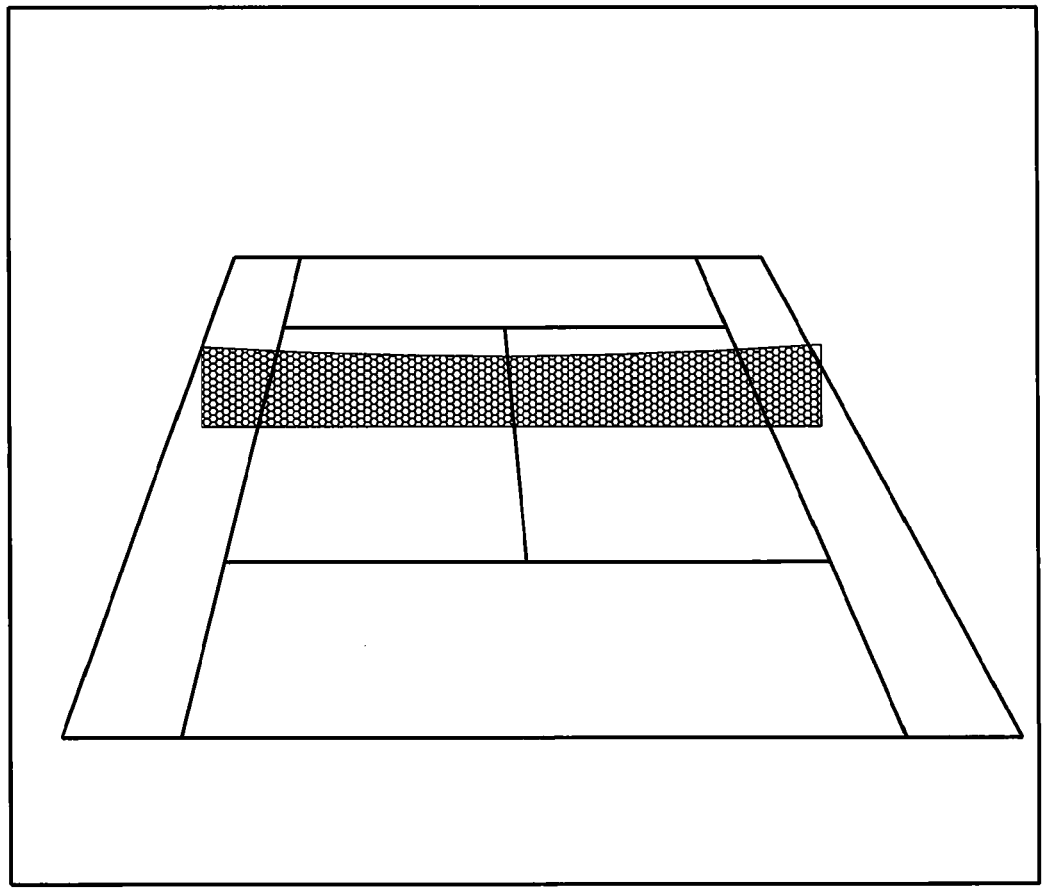
FIG. 6 is a diagram of a reconstructed frame of the present invention.

In step S223, after the sprite plane 131 is generated, a reconstructed frame 141 is obtained from the sprite plane 131 through a coordination transformation process of matrix $M_{V2S}^{-1}$. Furthermore, there is no foreground object 16 occurred in the reconstructed frame 141, as shown in FIG. 6.

Figure 7:
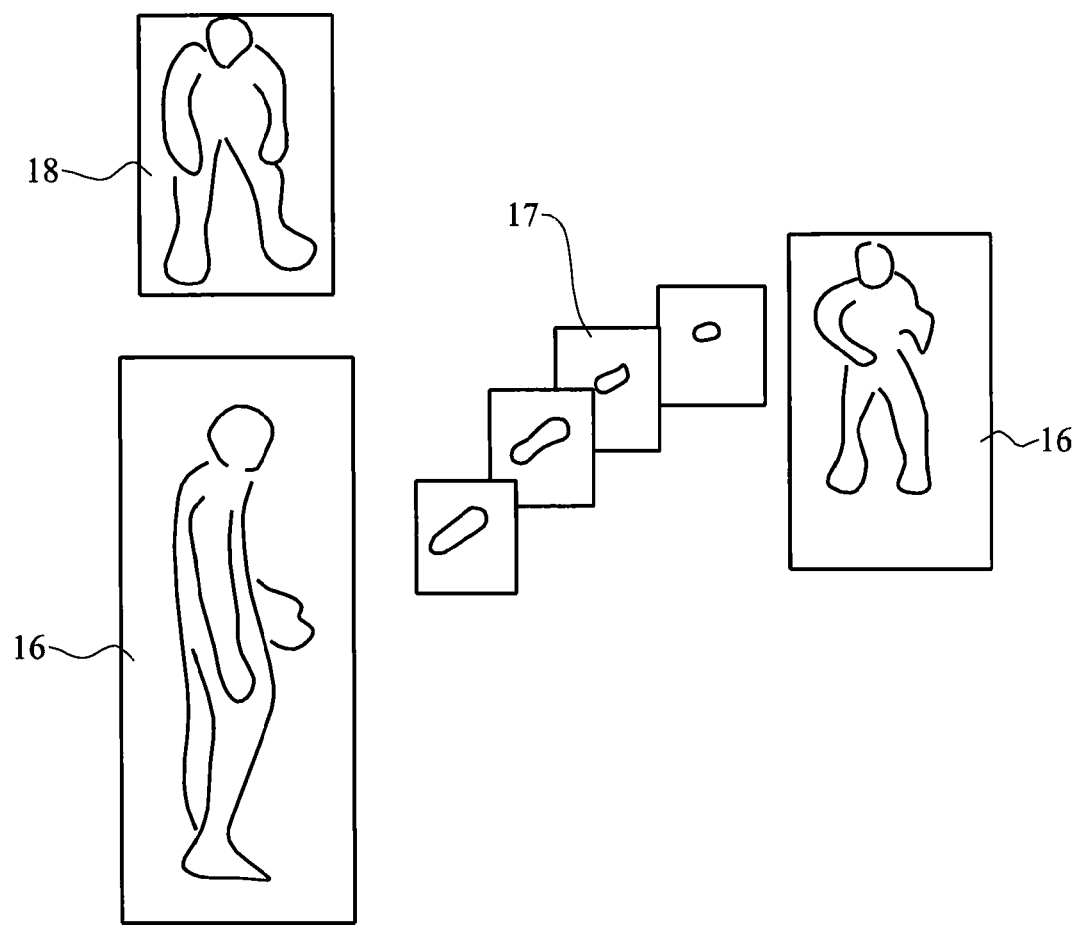
FIG. 7 is a diagram showing the foreground objects of the present invention.

Then, in step S224, comparing the frame difference between the reconstructed frame 141 and the video frame 115 having the foreground objects is performed, so as to separate each foreground object 16/17/18, such as player, ball and participant, as shown in FIG. 7.

Figure 8:
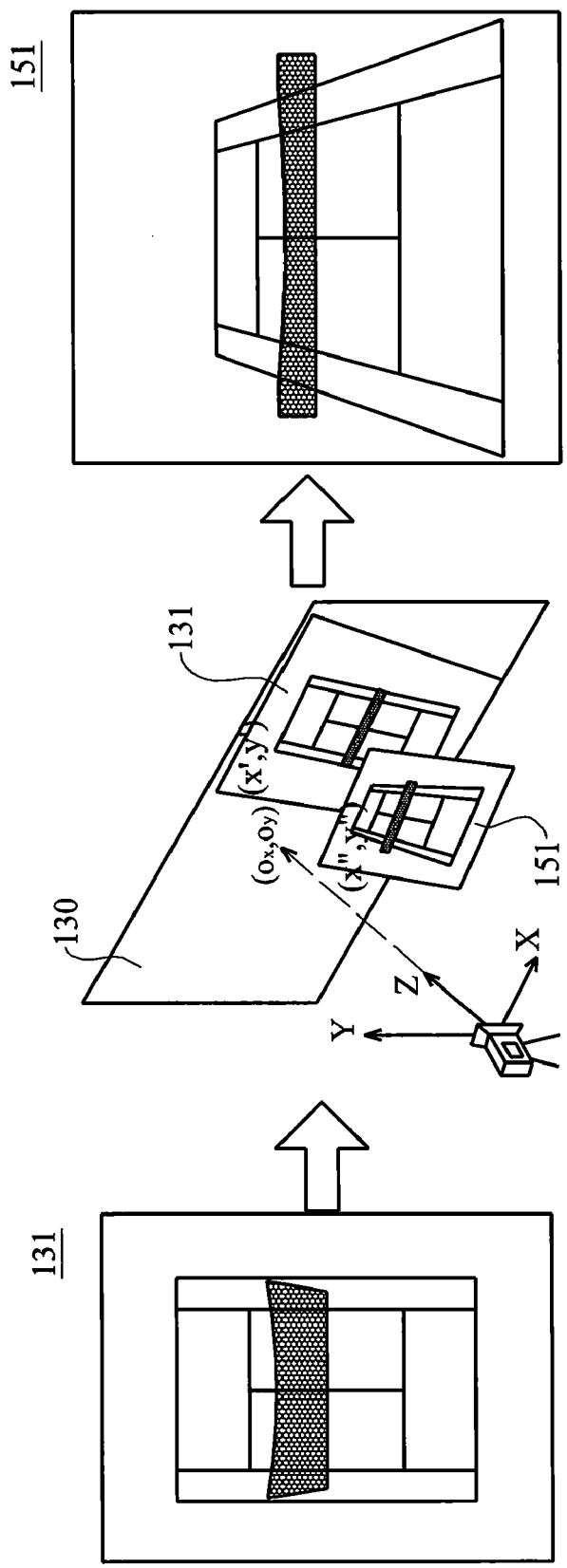
FIG. 8 is a diagram showing a process of transformation from the sprite plane into a watching frame according to the present invention.

After introducing the detailed flow chart of separating each of the foreground objects of the step S220 in FIG. 5, now, back to FIG. 1, in step S230, the watching frame 151 is generated from the sprite plane 131 of the background view 130 through the coordination transformation of matrix $M_{S2W}$, as shown in FIG. 8. The transformation is performed as per formula (4) shown as follows:

$$\begin{bmatrix} x'' \\ y'' \\ w'' \end{bmatrix} = M_{S2W} \begin{bmatrix} x' \\ y' \\ w' \end{bmatrix} = \begin{bmatrix} m_{s1} & m_{s2} & m_{s3} \\ m_{s4} & m_{s5} & m_{s6} \\ m_{s7} & m_{s8} & 1 \end{bmatrix} \begin{bmatrix} x' \\ y' \\ w' \end{bmatrix} \quad (4)$$

Wherein, $m_{s1}$ to $m_{s8}$ are the transformation factors of the matrix $M_{S2W}$, used for the transformation of the position coordination (x'/w', y'/w') in the sprite plane 131 into the position coordination (x''/w'', y''/w'') in the watching plane 151.

In step S240, the method of the present invention provides a plurality of bandwidth levels, such as the first bandwidth level (Level 1), the second bandwidth level (Level 2), and the third bandwidth level (Level 3). Viewer can select one appropriate bandwidth level based on the current bandwidth rate (named as "user selecting" hereinafter), or auto-selecting based on the current bandwidth rate can be executed by software and/or hardware (named as "auto-selecting" hereinafter); each bandwidth level proposes the different format for video content. Therefore, the different video content rendered by the video supplier is based on the selected bandwidth level so as to provide the differential bit-stream size. Furthermore, the video content of each bandwidth level is shown in FIG. 9A-9C, respectively.

In step S250, if Level 1 is selected, the player 16, the ball 17, and the participant 18 may be pasted on the watching frame 151. The watching frame 151 having foreground object 16/17/18 can be considered as a recombined target shot 51, as shown in FIG. 9A and FIG. 10.

Figure 9A:
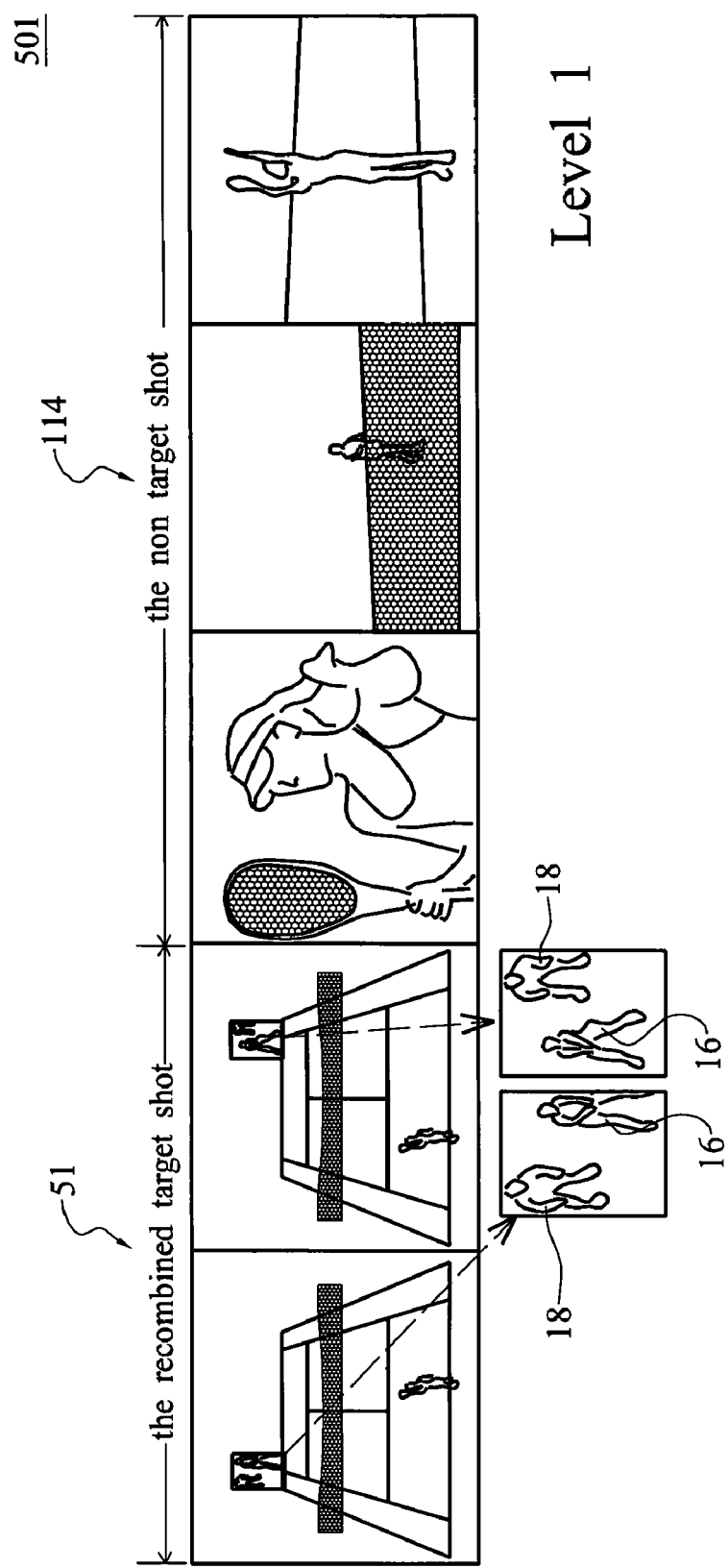
FIG. 9A-9C are diagrams showing the structure of corresponding recombined video unit according to the present invention.
Figure 9B:
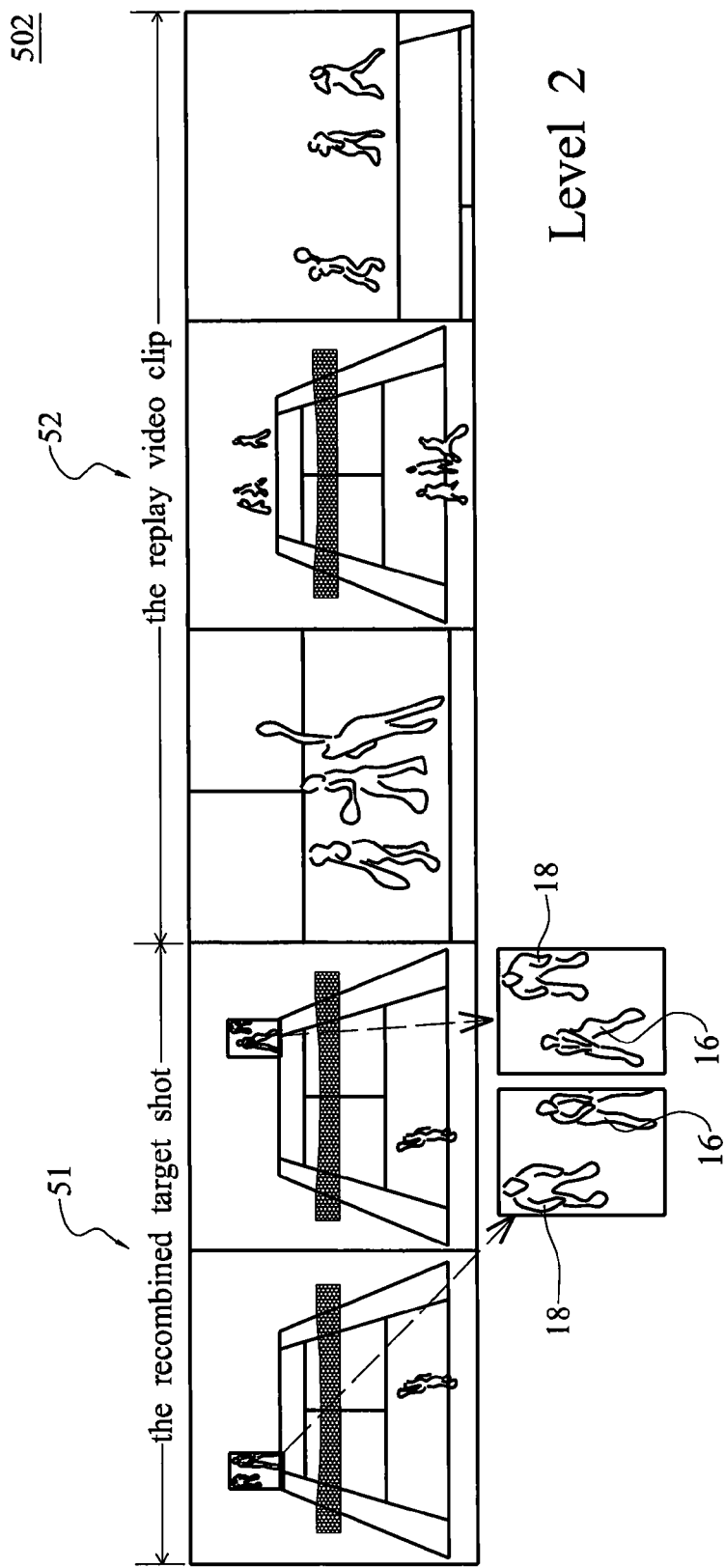
Figure 9C:
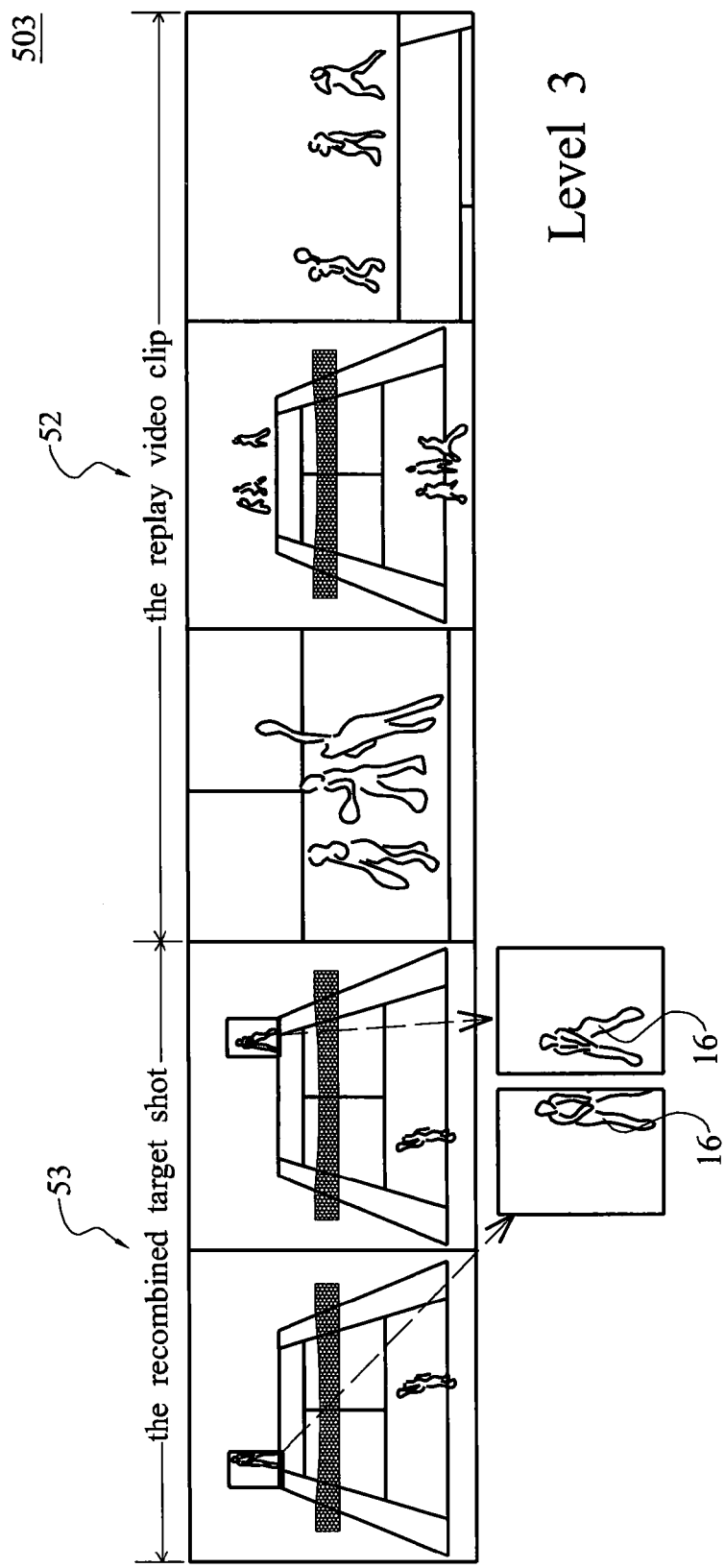
Figure 10:
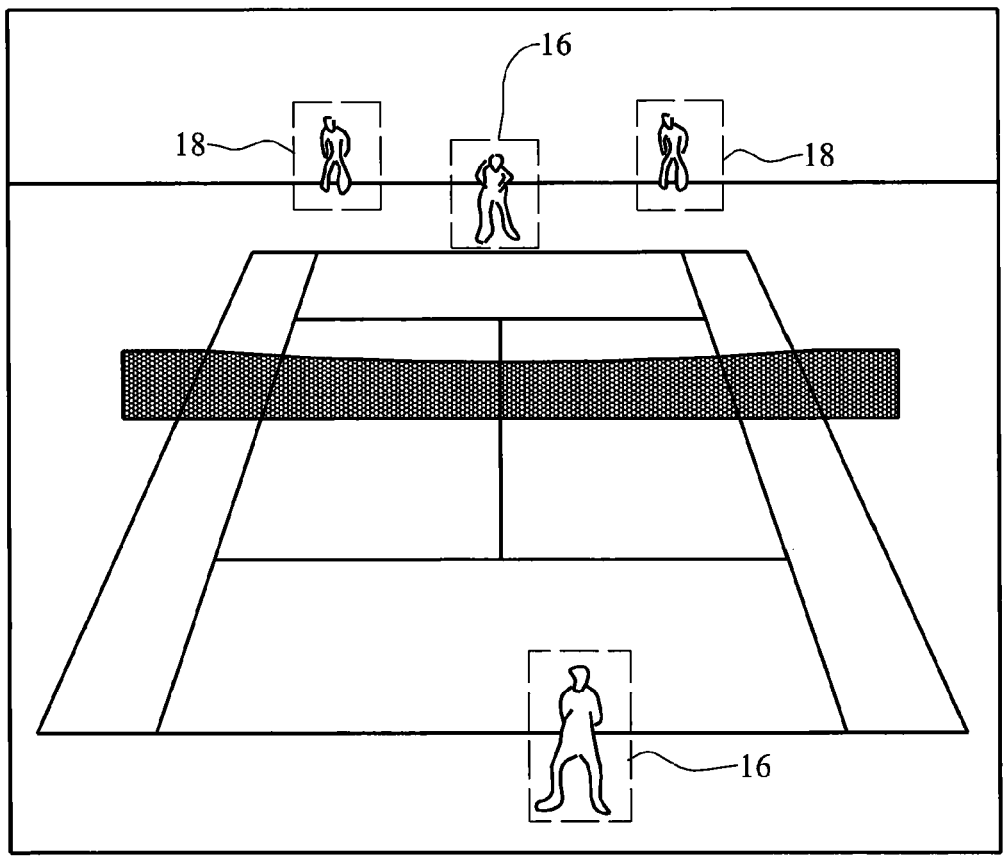
FIG. 10 is a diagram of one watching frame of the present invention.

And then, in step S260, the recombined target shot 51 and the non-target shot 114 can be merged to form a first recombined video unit 501, as shown in FIG. 9A.

When the method of the present invention is performed in Level 1, it can be used at a higher transmission bandwidth, and the recombined video content 501 can be identical to the original video unit 11. Moreover, the sprite plane 131 can be reused to decrease the bit-stream size; in other words, the sprite plane 131 is only transmitted once so as to decrease the bit-stream size in Level 1.

Figure 11:
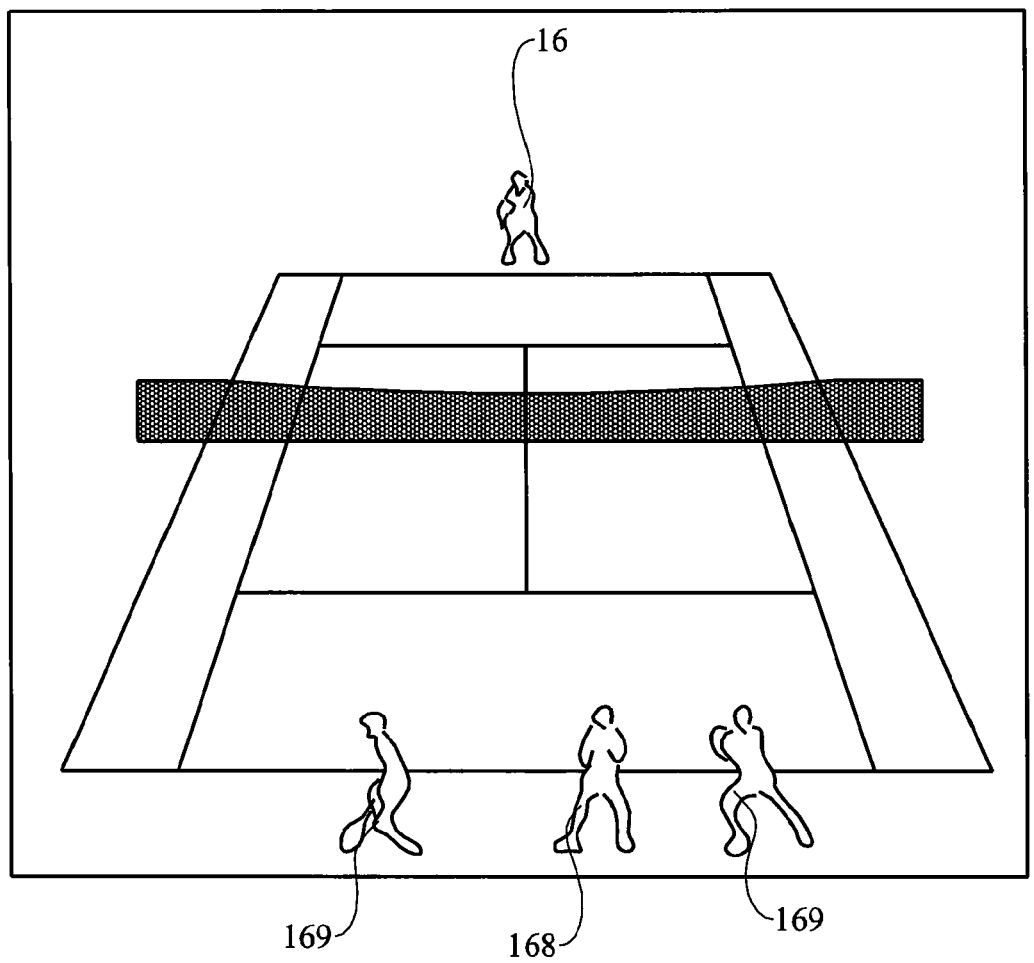
FIG. 11 is a diagram of another watching frame of the present invention.

In step S250, if Level 2 is selected, the player 16, the ball 17, and the participant 18 may be pasted on the watching frame 151. The watching frame 151 having foreground object 16/17/18 can be considered as a recombined target shot 51, as shown as FIG. 9B and FIG. 10. Compared with Level 1, Level 2 further comprises a step S255, the player at current time 168 and that at previous time 169 are pasted on watching frame 151, as shown in FIG. 11, so as to obtain at least one other recombined target shot 52. Other recombined target shot 52 is a replay video clip, which is used for replacing the non-target shot 114. In the present embodiment, the previous time is the time of player's hitting, as well as the replay video clip 52 is regarded as the video clip of player's hitting.

And then, in step S260, the recombined target shot 51 and other recombined target shot 52 can be merged to form a second recombined video unit 502, as shown in FIG. 9B.

When the method of the present invention is performed in Level 2, the sprite plane 131 is reused, and the non-target shots 114 are abandoned, so that the total bit-stream sizes of the video unit 502 in Level 2 can be dramatically decreased. Moreover, the empty playtime is generated from the abandonment of the non-target shots 114, it can be filled in by the replay video clip 52, thereby producing a more interesting experience during the highlight replay of player's hitting.

Figure 12:
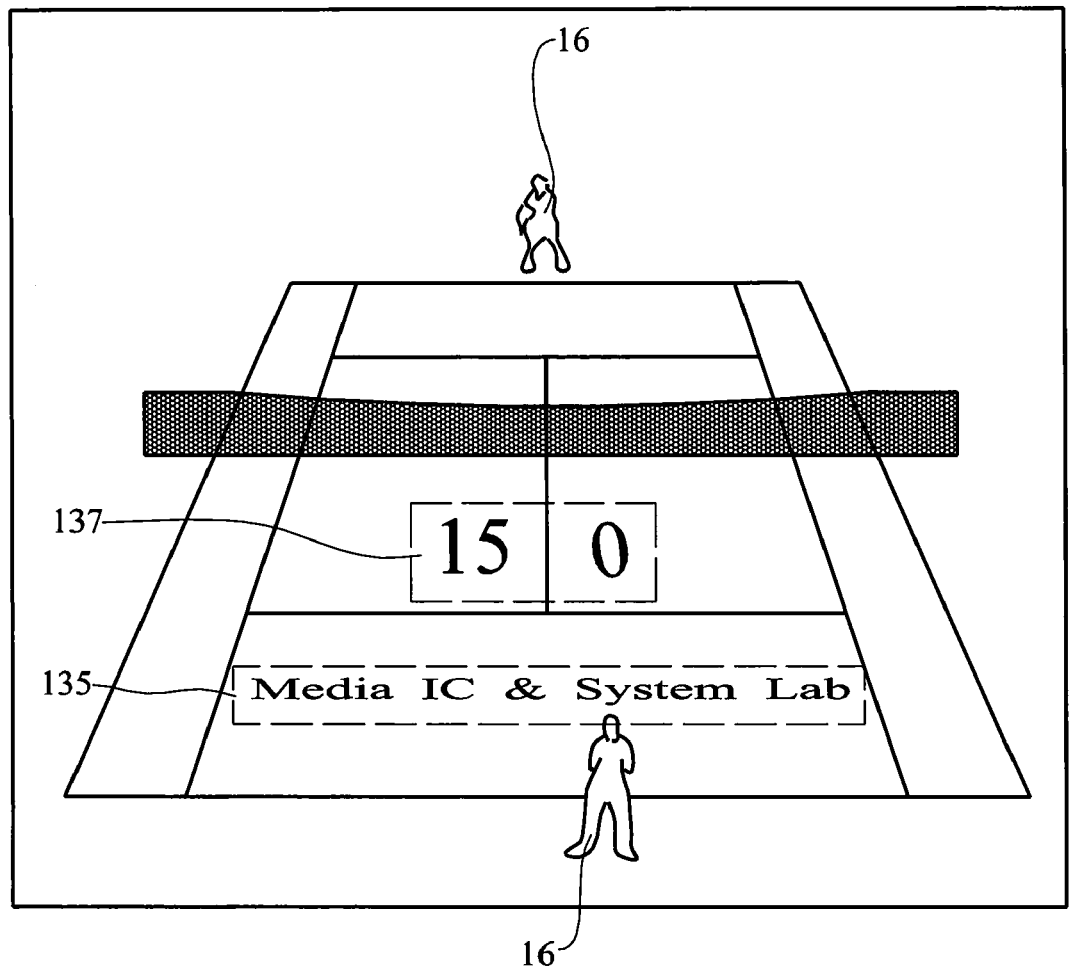
FIG. 12 is a diagram of another watching frame of the present invention.

In step S250, if Level 3 is selected, the player 16 and the ball 17 may be pasted on the watching frame 151. The watching frame 151 having foreground object 16/17 can be considered as a recombined target shot 53; the recombined target shot 53 does not include the participants 18 of the foreground object, as shown in FIG. 9C and FIG. 12. Comparing with Level 1, Level 3 further comprises a step S255, the player at current time 168 and that at previous time 169 are pasted on the watching frame 151, as shown in FIG. 11, so as to obtain at least one other recombined target shot 52.

And then, in step S260, the recombined target shot 53 and the replay video clip 52 can be merged to form a third recombined video unit 503, as shown in FIG. 9C.

When the method of the present invention is performed in Level 3, it can further decreases the video content, the sprite plane 131 is reused, the non-target shots 114 are abandoned, and the recombined target shot 53 includes no participants 18 (for example: audiences, ball boy, referee) of the foreground object. During the game proceeding, viewers tend to pay the most attention to players and ball; thereby, abandoning the participants 18 causes little disturbance when viewer are watching the video. Similar to Level 2, the replay clip 52 is used for filling the empty time of the abandonment of the non-target shot 114 in Level 3.

Subsequently, a mobile phone, a computer, or an electrical device having a commutation function is adopted to broadcast the corresponding recombined video unit 501/502/503 based on the bandwidth level selected by viewer.

Further, the present invention can further comprise a step S225, before the transformation of the sprite plane 131 into the watching frame 151 is performed, an advertisement, a text 135, or a score count 137 can be inserted into the sprite plane 131, and thereby used to edit the sprite plane 131. Then, in step S230, after the transformation of the sprite plane 131 into the watching frame 151 is completed, the plentiful visual effect can be generated in the latter, so that viewers may get more enjoyment on game watching, as shown in FIG. 12.

Figure 13:
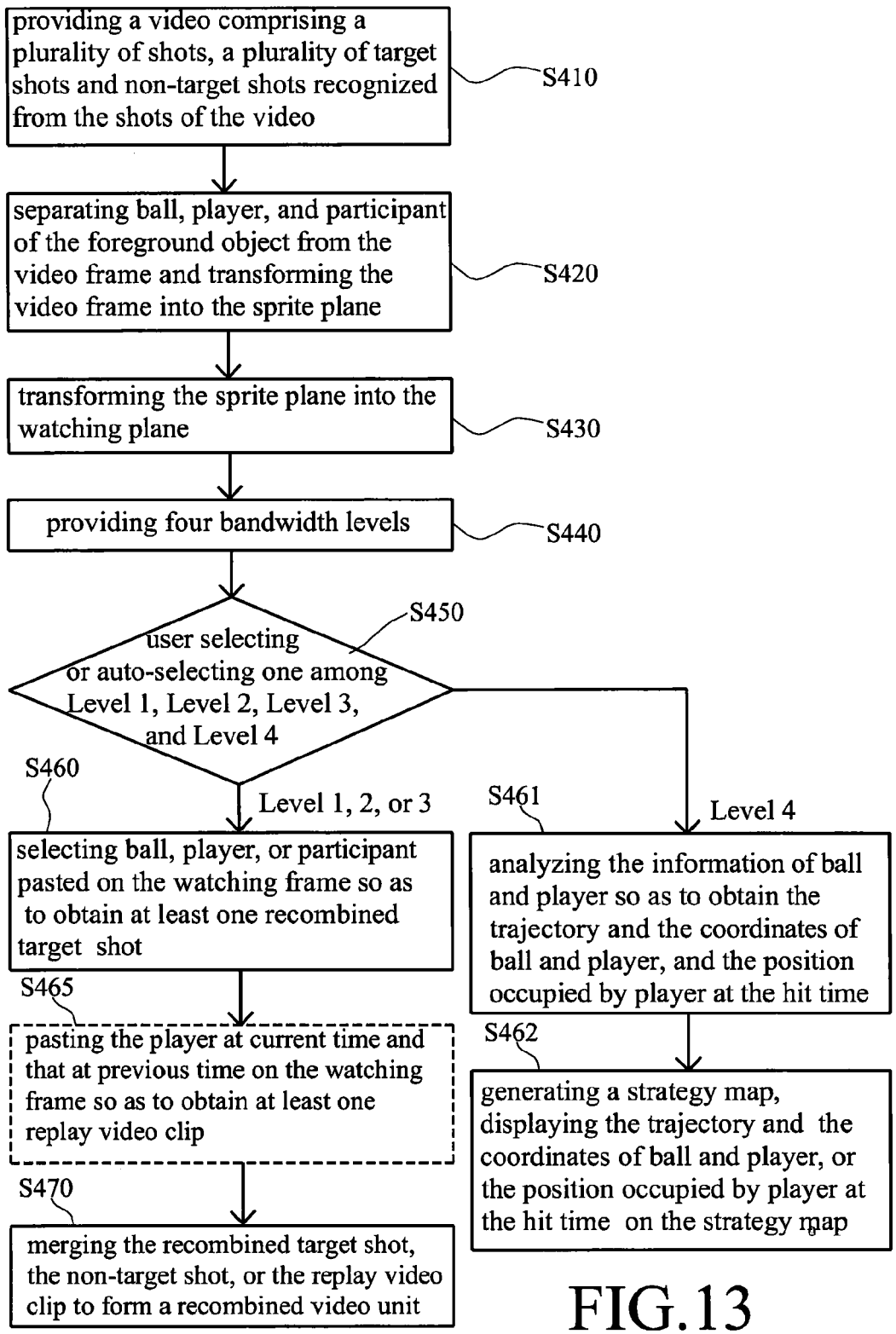
FIG. 13 is a flow chart of a method for scaling video content based on the bandwidth rate according to another embodiment of the present invention.

Referring to FIG. 13, there is shown a flow chart of a method for scaling video content based on the bandwidth rate according to another embodiment of the present invention. Comparing with the embodiment in FIG. 1, the present embodiment further provides a fourth bandwidth level (Level 4).

S410 of the present embodiment is similar to S210 of the embodiment in FIG. 1, where a reference shot 112 is used for detecting each shot 111 of video 100 so as to recognize a plurality of target shots 113 similar to the reference shot 112 and a plurality of non-target shots 114. A color histogram is used for the recognition of the similarity degree between the reference shot 112 and the shots 111 so as to classify the target shot 113 and the non-target shot 114 rapidly, and the target shot 113 of the present embodiment is a serve shot, as shown in FIG. 3.

In the S420, the video frame 115 of the target shot 113 is transformed into the sprite plane 131, and thereby separates out a play field as the background scene, at least one foreground object, such as: ball 17, player 16, and participants 18.

The detailed step of the separation of the background and the foreground object is described above in FIG. 5, and here it is not described again.

In step S430, the sprite plane 131 is transformed into the watching frame 151, as shown in FIG. 8.

In step S440, the method of the present embodiment provides four bandwidth levels (Level 1-4) to scale the rendering video content based on the bandwidth level.

In step S450, the viewer can select one appropriate bandwidth level based on the current bandwidth rate (as "user selecting") from the group consisting of the following: the first bandwidth level (Level 1), the second bandwidth level (Level 2), the third bandwidth level (Level 3), and the fourth level (Level 4). Also, auto-selecting based on the current bandwidth rate from Levels 1, 2, 3, and 4 can be executed by software and/or hardware (as "auto-selecting"). If Levels 1, 2, and 3 are selected, the step S460 is performed; if Level 4 is selected, the step S461 is performed.

In step S450, if Level 1 is selected, the step S460 is performed afterward, and the player 16, the ball 17, and the participant 18 may be pasted on the watching frame 151. The watching frame 151 having foreground object 16/17/18 can be considered as a recombined target shot 51, as shown in FIG. 9A and FIG. 10.

And then, in step S470, the recombined target shot 51 and the non-target shot 114 can be merged to form a first recombined video unit 501, as shown as FIG. 9A.

In step S450, if Level 2 is selected, the step S460 is performed afterward, the player 16, the ball 17, and the participant 18 may be pasted on the watching frame 151. The watching frame 151 having foreground object 16/17/18 can be considered as a recombined target shot 51, as shown in FIG. 9B and FIG. 10. Compared with Level 1, Level 2 further comprises a step S465; the player at current time 168 and that at previous time 169 are pasted on the watching frame 151, as shown in FIG. 11, so as to obtain at least one other recombined target shot 52. Other recombined target shot 52 is a replay video clip, which is used for replacing the non-target shot 114. In the present embodiment, the previous time is the time of player's hitting, as well as the replay video clip 52 is regarded as the video clip of player's hitting.

And then, in step S470, the recombined target shot 51 and other recombined target shot 52 can be merged to form a second recombined video unit 502, as shown in FIG. 9B.

In step S450, if Level 3 is selected, the step 460 is performed afterward, and the player 16 and the ball 17 may be pasted on the watching frame 151. The watching frame 151 having foreground object 16/17 can be considered as a recombined target shot 53, the recombined target shot 53 does not include the foreground object of the participants 18, as shown in FIG. 9C and FIG. 12. Comparing with Level 1, Level 3 further comprises a step S465, the player at current time 168 and that at previous time 169 are pasted on the watching frame 151, as shown in FIG. 11, so as to obtain at least one other recombined target shot 52.

And then, in step S470, the recombined target shot 53 and the replay video clip 52 can be merged to form a third recombined video unit 503, as shown in FIG. 9C.

Otherwise, in the Step 450, Level 4 is selected; the step 461 is performed afterward, where an analysis of the information of the player 16 and the ball 17 is performed to obtain the coordinates 161/171 of the player and ball, the trajectory 162/172 of the player and ball, and the position 163 of player's hitting. Furthermore, the detailed analysis step is introduced in a later statement.

Figure 9D:
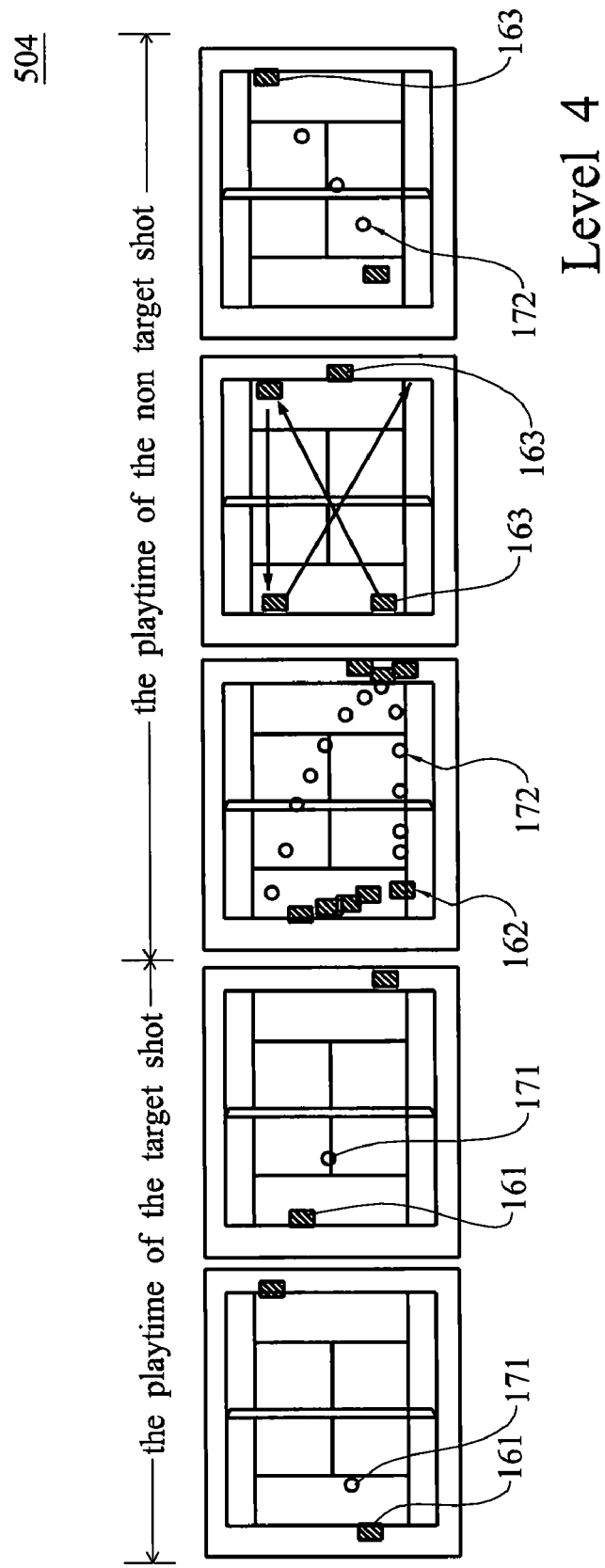
FIG. 9D is a diagram showing the structure of a strategy map according to the present invention.

Then, in step S462, a strategy map 504 is generated, as shown in FIG. 9D. The coordinates 161/171 of the player and the ball of the current target shot 113 can be shown on the strategy map 504 during the playtime of the current target shot 113, and the trajectory 162/172 of the player/ball or the position 163 of player's hitting can be shown on the strategy map 504 during the playtime of the original non-target shot 114.

When the method of the present invention is performed in Level 4, it can be used at an extremely low transmission bandwidth, such as a real-time broadcasting on a mobile phone, the video content is abandoned, with, only the information of movement coordinate in the sprite plane 131 transmitted. Although without player gestures or other detailed game information, the state of the game can still be learned by way of the strategy map 504. Moreover, viewers may discuss the winning strategies and easily analyze the information of the player 16, for example, by the hitting positions of the player 16 and the ball 17 presented on the strategy map 504.

Subsequently, a mobile phone, a computer, or an electrical device having a commutation function is adopted to broadcast the corresponding recombined video unit 501/502/503, or represent the strategy map 504 based on the bandwidth level for user selecting or auto-selecting.

As described above, the present invention provides a plurality of bandwidth levels (Level 1-4) for user selecting or auto-selecting, thus the video bit-stream size and the video content thereof can be scaled to suitable for the current bandwidth rate, so that viewer can enjoy high-quality video frame under the lower bandwidth rate.

Figure 14:
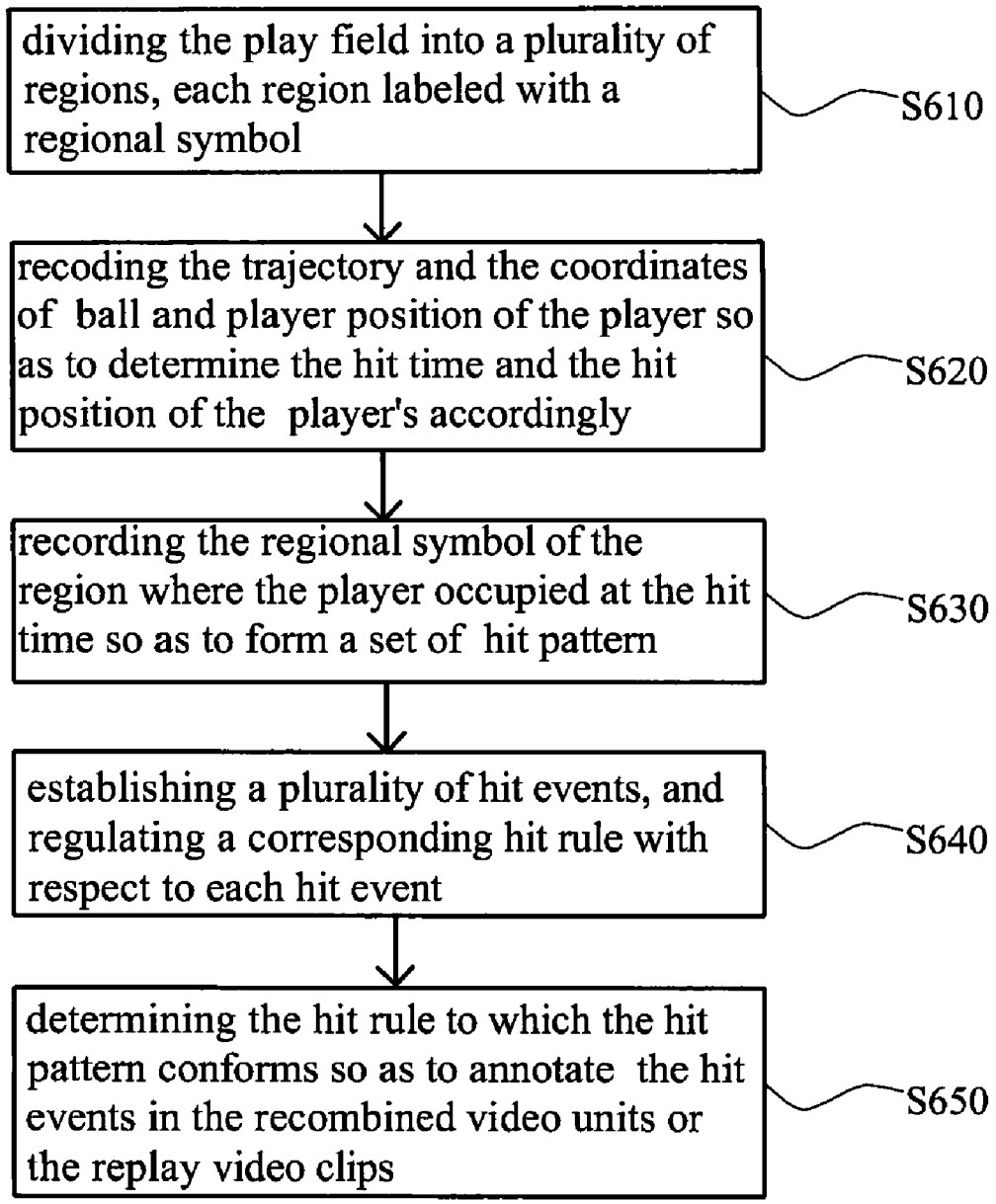
FIG. 14 is a flow chart for analyzing the information of foreground objects according to the present invention.

Referring to FIG. 14, there is shown a flow chart of the analysis of the information of the foreground object according to the present invention. In the game video, the hit frame is an excited video frame, such as Shooting in soccer, Strike out in baseball, or Ace in tennis. For the video 100, if each recombined video unit 501/502/503 can be annotated with individual hit event, the viewers is able to click and select the desired hit frame immediately, and moreover, may review video highlights.

In the flow chart of the present embodiment, taking the tennis game as an example, the information of the foreground object (e.g., a player 16, ball 17) is analyzed in video 100, so as to annotate on a hit event in each recombined video unit 501/502/503.

Figure 15:
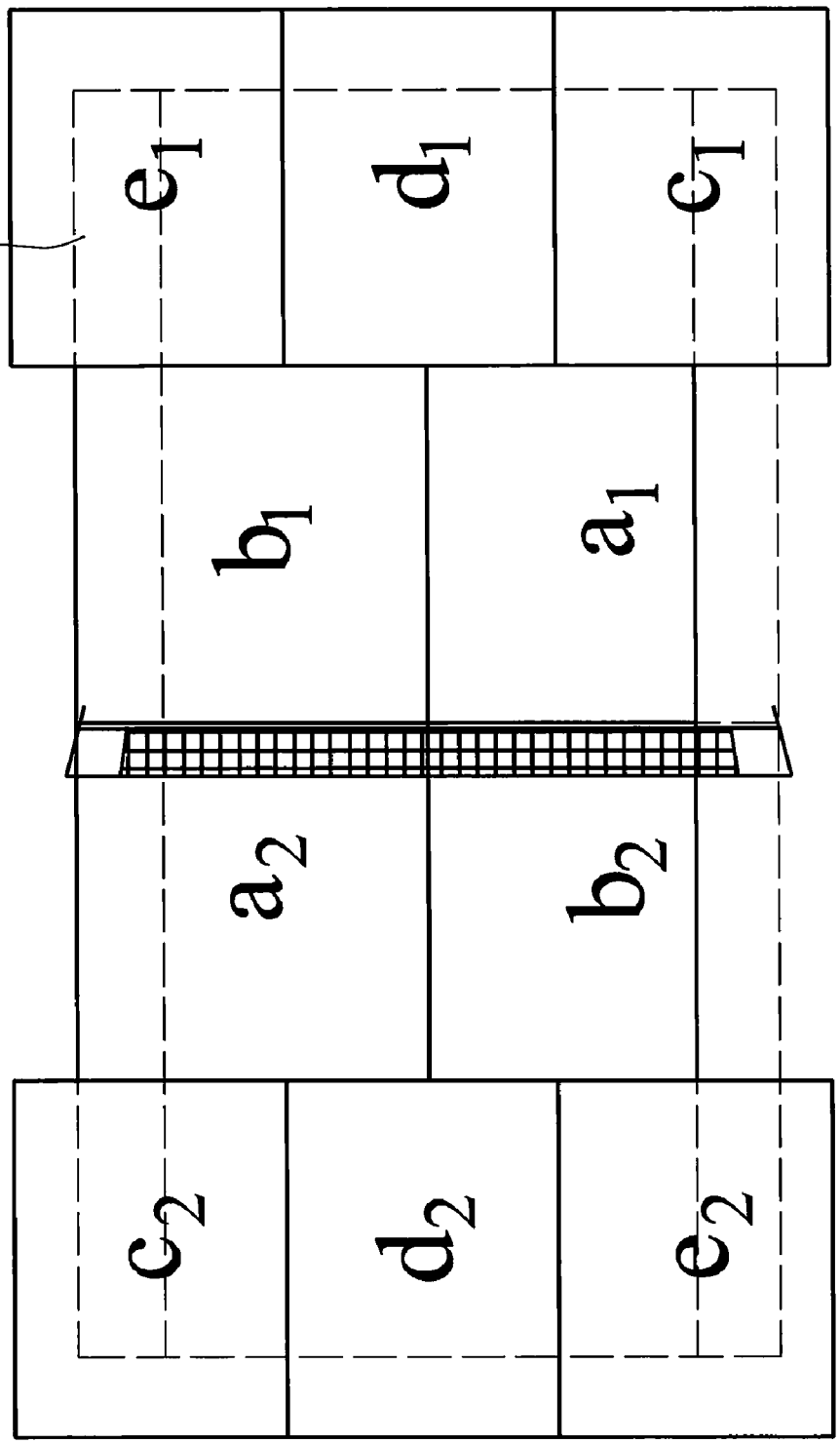
FIG. 15 is a configuration diagram of a play field according to the present invention.

First, in step S610, the sprite plane 131 comprises a play field 133 as the background scene. The play field 133 can be divided into a plurality of regions 134, each regions 134 being labeled with a symbol $a_1$, $b_1$, $c_1$, $d_1$, $e_1$, $a_2$, $b_2$, $c_2$, $d_2$, $e_2$, etc., as shown in FIG. 15.

Figure 16:
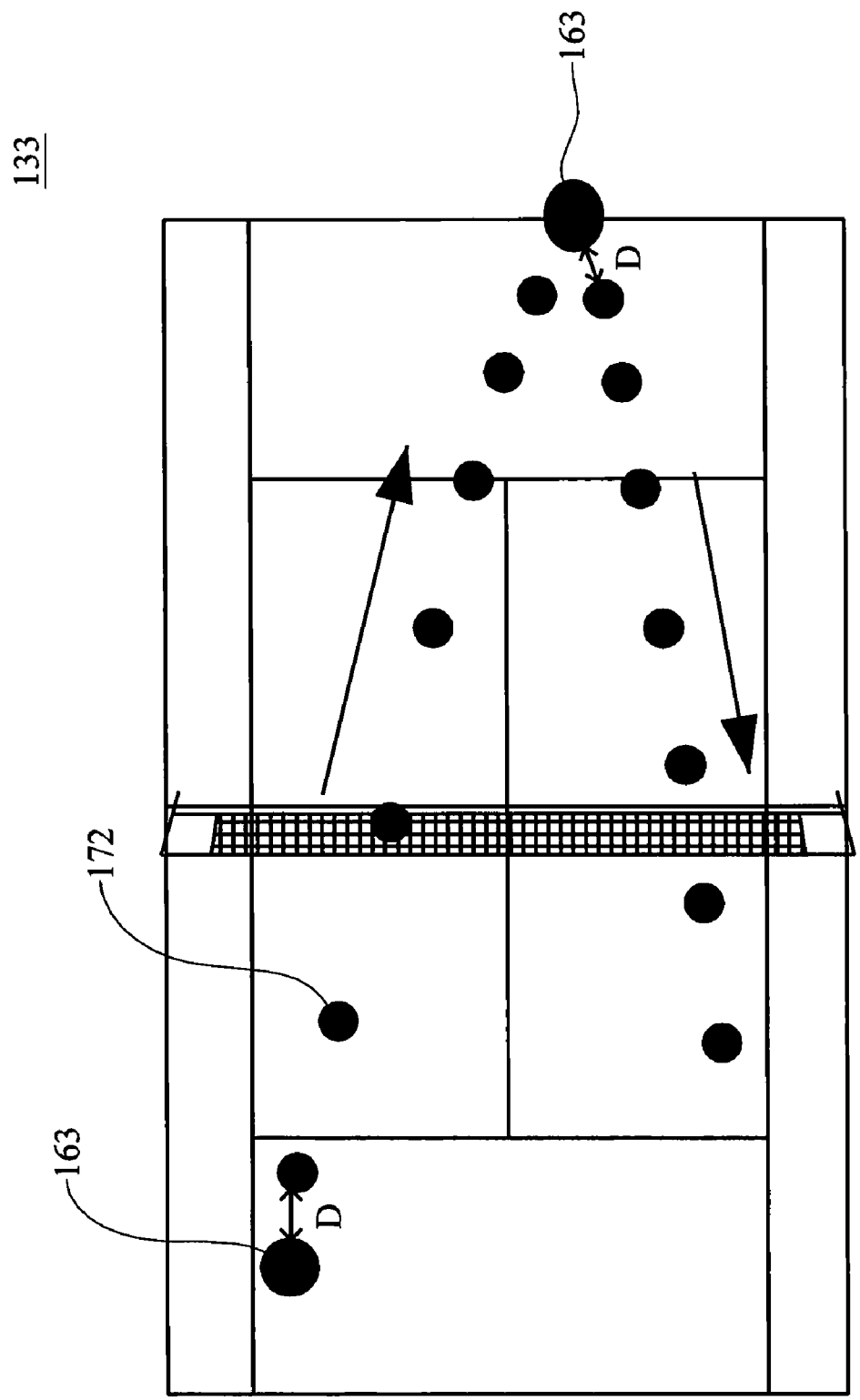
FIG. 16 is a diagram showing the play field with trajectories of balls and positions of players recorded therein according to the present invention.

In step S620, the coordinates 161/171 and trajectory 162/172 of player 16 and ball 17 can be recorded in the play field 133, thus used to decide the hit time and the hit position 163 of the player's, as shown in FIG. 9D. The hit time is considered as the time index of player's hitting with respect to a minimum distance D between the trajectory 172 of the ball 17 and the coordinate 161 of the player 16, as shown in FIG. 16.

In step S630, the symbols for the regions (e.g. region 134) where the players 16 occupied at the hit time can be recorded, and then combined as a set of hit pattern. As shown in FIG. 16, the play field 133 with trajectories 172 of balls and hitting positions 163 of player's 16 are recorded therein. Each position 163 in FIG. 16 can be recognized as corresponding region 134 in FIG. 15, so as to record the symbols ($c_2 d_1$) that are labeled on the corresponding region 134, and then the recorded symbols ($c_2 d_1$) are combined as a set of hit pattern.

In step S640, a plurality of hit events are established, such as Ace, Double fault, Rally, and Break point. A corresponding hit rule to each hit event can be regulated individually. The hit rule for individual hit event can be regulated depending on the regions 134 occupied by the players 16 at the hit time. For example, the hit rule for Ace event is regulated as the regions 134 occupied by the players 16 at the hit time may be $c_1$, $d_1$, $e_1$, $c_2$, $d_2$, or $e_2$, while the hit rule for Rally event is regulated as the regions 134 occupied by the players 16 at the hit time may be $c_1$, $d_1$, $e_1$, $c_2$, $d_2$, or $e_2$. Naturally, the accurately establishment of hit event can further increase at least one hit rule, such as the number of symbol for the hit pattern.

In step S650, the hit rule to which the hit pattern conforms is determined, in such a way the recombined video unit 501/502/503 can be annotated with the hit event represented by the hit rule. For example, a set of hit pattern ($c_2 d_1$) obtained from the analysis of the target shot 113 conforms to the hit rule regulated depending on Rally event, and then the recombined video unit 501/502/503 can be annotated with Rally event. In this case, accordingly, each recombined video unit 501/502/503 having the target shot 113 can be annotated with the hit event individually.

Although the above embodiment is described for the tennis game as an example, it is also possible applied to other sports, such as baseball, archery, table tennis, and tennis, etc., practically. As such, the shot frame of interest in the sport game, such as Pitch shot, Shooting shot, for example, may be used for annotation of the video.

The foregoing description is merely one embodiment of the present invention and not considered as restrictive. All equivalent variations and modifications in shape, structure, feature, and spirit in accordance with the appended claims may be made without in any way from the scope of the invention.

What is claimed is:

1. A method for scaling video content based on bandwidth rate, comprising the steps of:
   providing a plurality of bandwidth levels, and one among said bandwidth levels is selected;
   wherein said bandwidth levels are provided for video comprising a plurality of shots, a plurality of target shots and a plurality of non-target shots recognized from said shots of said video, each of said target shots comprising a sequence of video frames, at least one of said video frames comprising a play field scene of background and a plurality of foreground objects, said foreground objects comprising a ball, at least one player and at least one participant,
   separating all of said foreground objects from at least one video frame from said sequence of video frames;
   transforming said video frame into a sprite plane;
   analyzing the information of said ball and said player of said target shot so as to obtain the trajectory and the coordinates of said ball and said player, and the position occupied by said player at the hit time;
   transforming said sprite plane into a watching frame, the above mentioned method of scaling video content based on the bandwidth rate;
   at least one foreground object is selected and pasted on said watching frame based on the selected bandwidth level, so as to obtain at least one recombined target shot; and
   merging at least one of said recombined target shots with at least one of said non-target shots or merging at least one of said recombined target shots with another recombined target shot based on the selected bandwidth level to form a recombined video unit,
   wherein said separating each of said foreground objects from said video frame comprises filtering off each of said foreground objects in said sprite plane, wherein said step of analyzing the information of said ball and said player comprising the steps of:
- dividing said play field into a plurality of regions;
- labeling each of said regions with a regional symbol;
- recording the trajectory and the coordinates of said ball and said player;
- determining the hit time and the hit position of said player;
- recording said regional symbol of said region where said player occupied at said hit time;
- forming a set of hit pattern;
- establishing a plurality of hit events, and regulating a corresponding hit rule with respect to each of said hit events;
- determining said hit rule to which said hit pattern conforms; and
- annotating said hit events in said recombined target shot or said replay video clip.

2. The method according to claim 1, wherein at least one of the foreground objects at a current time and at least one of the foreground objects at a previous time are pasted on said watching frame, so as to obtain at least one replay video clip, said replay video clip is regarded as other recombined target shot.

3. The method according to claim 1, further comprising detecting all of said shots of said video on the basis of a reference shot to recognize said plurality of target shots similar to said reference shot and said plurality of non-target shots.

4. The method according to claim 3, wherein a color histogram is used for the comparison between said reference shot and each of said shots to recognize said target shots and said non-target shots.

5. The method according to claim 1, wherein separating each of said foreground objects from said video frame further comprises the steps of:
- transforming said sprite plane into a reconstructed frame; and
- comparing the frame difference between said reconstructed frame and said video frame having all of said foreground objects, so as to separate each of said foreground objects from said video frame.

6. The method according to claim 5, wherein said step of filtering off each of said foreground objects in said sprite plane further comprising the steps of:
- calculating a histogram bin of a pixel value for a period of time at individual position coordination in said video frame; and
- extracting a maximum pixel value from said histogram bin of the pixel value at individual position coordination in said video frame, as the pixel value of each position coordination in said sprite plane.

7. The method according to claim 3, wherein said reference shot and said target shots are serve shots, and the non-target shots are non-serve shots.

8. The method according to claim 7, wherein said background scene is a play field, and wherein at least one of said foreground objects comprises a ball, at least one player and a plurality of participants.

9. The method according to claim 8, wherein said participants are audiences, ball boys or referees.

10. The method according to claim 8, wherein before said sprite plane transforms into said watching frame, further comprising the step of
- inserting an advertisement, a text comment, or a score box into said sprite plane.

11. A method for scaling video content based on bandwidth rate, comprising the steps of:
- providing four bandwidth levels according to video-stream size;
- wherein said bandwidth levels are provided for video comprising a plurality of shots, a plurality of target shots and a plurality of non-target shots recognized from said shots of said video, each of said target shots comprising a sequence of video frames, at least one of said video frames comprising a play field scene of background and a plurality of foreground objects, said foreground objects comprising a ball, at least one player and at least one participant;
- separating all of said foreground objects from at least one video frame from said sequence of video frames;
- transforming said video frame into a sprite plane;
- analyzing the information of said ball and said player of said target shot so as to obtain the trajectory and the coordinates of said ball and said player, and the position occupied by said player at the hit time;
- transforming said sprite plane into a watching frame;
- wherein providing four bandwidth levels, respectively comprising:
  - a first bandwidth level, comprising pasting all of said foreground objects on said watching frame to obtain at least one recombined target shot, merging at least one of said recombined target shots with at least one of said non-target shots to form a first recombined video unit, wherein said first bandwidth level decreases the bit-stream size by reusing said sprite plane;
  - a second bandwidth level, comprising pasting all of said foreground objects on said watching frame to obtain at least one recombined target shot, abandoning said non-target shots, merging at least one of said recombined target shots with another recombined target shot to form a second recombined video unit, wherein said second bandwidth level decreases the bit-stream size by reusing said sprite plane and abandoning said non-target shots;
  - a third bandwidth level, comprising abandoning at least one foreground object, pasting the remaining foreground objects on said watching frame to obtain at least one recombined target shot, abandoning said non-target shots, merging at least one of said recombined target shots with another recombined target shot to form a third recombined video unit, wherein said third bandwidth level decreases the bit-stream size by reusing said sprite plane, abandoning said non-target shots and abandoning at least one foreground object; and
  - a fourth bandwidth level, providing movement coordinates information of at least one foreground object on said sprite plane so as to generate a strategy map, wherein said fourth bandwidth level decreases the bit-stream size by abandoning the video content and providing movement coordinates information of at least one foreground object; and
- according to one selected among said first bandwidth level, said second bandwidth level, said third bandwidth level and said fourth bandwidth level, playing said corresponding video unit or displaying said strategy map,
- wherein said separating each of said foreground objects from said video frame comprises filtering off each of said foreground objects in said sprite plane, wherein said step of analyzing the information of said ball and said player comprising the steps of:
   dividing said play field into a plurality of regions;
   labeling each of said regions with a regional symbol;
   recording the trajectory and the coordinates of said ball and said player;
   determining the hit time and the hit position of said player;
   recording said regional symbol of said region where said player occupied at said hit time;
   forming a set of hit pattern;
   establishing a plurality of hit events, and regulating a corresponding hit rule with respect to each of said hit events;
   determining said hit rule to which said hit pattern conforms; and
annotating said hit events in said recombined target shot or said replay video clip.

12. The method according to claim 11, wherein at least one of the foreground objects at a current time and at least one of the foreground objects at a previous time are pasted on said watching frame, so as to obtain at least one replay video clip, said replay video clip is regarded as other recombined target shot.

13. The method according to claim 11, further comprising detecting all of said shots of said video on the basis of a reference shot to recognize said plurality of target shots similar to said reference shots and said plurality of non-target shots.

14. The method according to claim 13, wherein a color histogram is used for the comparison between said reference shot and each of said shots to recognize said target shots and said non-target shots.

15. The method according to claim 11, wherein separating each of said foreground objects from said video frame further comprises the steps of:
   transforming said sprite plane into a reconstructed frame; and
   comparing the frame difference between said reconstructed frame and said video frame having all of said foreground objects, so as to separate out each of said foreground objects from said video frame.

16. The method according to claim 15, wherein said step of filtering off each of said foreground objects in said sprite plane further comprising the steps of:
   calculating a histogram bin of a pixel value for a period of time at individual position coordination in said video frame; and
   extracting a maximum pixel value from said histogram bin of the pixel value at individual position coordination in said video frame, as the pixel value of each position coordination in said sprite plane.

17. A method for scaling video content based on the bandwidth rate, comprising the steps of:
   providing four bandwidth levels according to video-stream size;
   wherein said bandwidth levels are provided for video comprising a plurality of shots, a plurality of target shots and a plurality of non-target shots recognized from said shots of said video, each of said target shots comprising a sequence of video frames, at least one of said video frames comprising a play field scene of background and a plurality of foreground objects, said foreground objects comprising a ball, at least one player and at least one participant;
   separating all of said foreground objects from at least one video frame from said sequence of video frames;
   transforming said video frame into a sprite plane;
   analyzing the information of said ball and said player of said target shot so as to obtain the trajectory and the coordinates of said ball and said player, and the position occupied by said player at the hit time;
   transforming said sprite plane into a watching frame;
   wherein providing four bandwidth levels, respectively comprising:
      a first bandwidth level, comprising pasting said player, said ball and said participant on said watching frame to obtain a recombined target shot, and merging at least one of said recombined target shots with at least one of said non-target shots to form a first recombined video unit;
      a second bandwidth level, comprising pasting said player at current time and that at previous time on said watching frame so as to obtain at least one replay video clip, and merging at least one of said recombined target shots with at least one of said replay video clips to form a second recombined video unit;
      a third bandwidth level, comprising pasting said player and said ball on said watching frame so as to obtain said recombined target shot, and merging at least one of said recombined target shots with at least one of said replay video clips to form a third recombined video unit;
      a fourth bandwidth level, comprising generating a strategy map, and displaying the trajectory of said ball and said player, the coordinates of said ball and said player, or the position occupied by said player at the hit time on said strategy map; and
   according to one selected among said first bandwidth level, said second bandwidth level, said third bandwidth level and said fourth bandwidth level, playing said corresponding recombined video unit or displaying said strategy map,
   wherein said separating each of said foreground objects from said video frame comprises filtering off each of said foreground objects in said sprite plane,
   wherein said step of analyzing the information of said ball and said player comprising the steps of:
      dividing said play field into a plurality of regions;
      labeling each of said regions with a regional symbol;
      recording the trajectory and the coordinates of said ball and said player;
      determining the hit time and the hit position of said player;
      recording said regional symbol of said region where said player occupied at said hit time;
      forming a set of hit pattern;
      establishing a plurality of hit events, and regulating a corresponding hit rule with respect to each of said hit events;
      determining said hit rule to which said hit pattern conforms; and
   annotating said hit events in said recombined target shot or said replay video clip.

18. The method according to claim 17, further comprising detecting all of said shots of said video on the basis of a reference shot to recognize said plurality of target shots similar to said reference shots and said plurality of non-target shots.

19. The method according to claim 18, wherein a color histogram is used for the comparison between said reference shot and each of said shots to recognize said target shots and said non-target shots.

20. The method according to claim 17, wherein separating each of said foreground objects from said video frame further comprises the steps of:
- transforming said sprite plane into a reconstructed frame; and
- comparing the frame difference between said reconstructed frame and said video frame having all of said foreground objects, so as to separate out each of said foreground objects from said video frame.

21. The method according to claim 20, wherein said step of filtering off each of said foreground objects in said sprite plane further comprising the steps of:
- calculating a histogram bin of a pixel value for a period of time at individual position coordination in said video frame; and
- extracting a maximum pixel value from said histogram bin of the pixel value at individual position coordination in said video frame, as the pixel value of each position coordination in said sprite plane.

22. The method according to claim 17, wherein said participants are audiences, ball boys and/or referees.

23. A method for scaling video content based on the bandwidth rate, comprising the steps of:
- providing four bandwidth levels according to video-stream size;
- wherein said bandwidth levels are provided for video comprising a plurality of shots, a plurality of target shots and a plurality of non-target shots recognized from said shots of said video, each of said target shots comprising a sequence of video frames, at least one of said video frames comprising a play field scene of background and a plurality of foreground objects, said foreground objects comprising a ball, at least one player and at least one participant;
- separating all of said foreground objects from at least one video frame from said sequence of video frames;
- transforming said video frame into a sprite plane;
- analyzing the information of said ball and said player of said target shot so as to obtain the trajectory and the coordinates of said ball and said player, and the position occupied by said player at the hit time;
- transforming said sprite plane into a watching frame;
- wherein providing four bandwidth levels, respectively comprising:
  - a first bandwidth level, comprising pasting said player, said ball and said participant on said watching frame to obtain a recombined target shot, and merging at least one of said recombined target shots with at least one of said non-target shots to form a first recombined video unit;
  - a second bandwidth level, comprising pasting said player at current time and that at previous time on said watching frame so as to obtain at least one replay video clip, and merging at least one of said recombined target shots with at least one of said replay video clips to form a second recombined video unit;
  - a third bandwidth level, comprising pasting said player and said ball on said watching frame so as to obtain said recombined target shot, and merging at least one of said recombined target shots with at least one of said replay video clips to form a third recombined video unit;
  - a fourth bandwidth level, comprising generating a strategy map, and displaying the trajectory of said ball and said player, the coordinates of said ball and said player, or the position occupied by said player at the hit time on said strategy map; and
- according to one selected among said first bandwidth level, said second bandwidth level, said third bandwidth level and said fourth bandwidth level, playing said corresponding recombined video unit or displaying said strategy map;
- wherein said step of analyzing the information of said ball and said player comprising the steps of:
  - dividing said play field into a plurality of regions;
  - labeling each of said regions with a regional symbol;
  - recoding the trajectory and the coordinates of said ball and said player; determining the hit time and the hit position of said player;
  - recording said regional symbol of said region where said player occupied at said hit time;
  - forming a set of hit pattern;
  - establishing a plurality of hit events; and
  - regulating a corresponding hit rule with respect to each of said hit events;
  - determining said hit rule to which said hit pattern conforms; and
  - annotating said hit events in said recombined target shot or said replay video clip.

24. The method according to claim 23, wherein said hit time is a time index of player's hitting with respect to a minimum distance between said trajectory of said ball and said position of said player.

25. The method according to claim 23, wherein said hit rule is regulated depending on the number of symbols used for said hit pattern or said region occupied by said player at said hit time.

26. The method according to claim 23, wherein said previous time is a hit time, and said replay video clip is a hit video clip.

* * * * *